April 7, 1964  J. M. R. BROCARD  3,128,062
AIRCRAFT

Filed Feb. 19, 1962  9 Sheets-Sheet 1

April 7, 1964  J. M. R. BROCARD  3,128,062
AIRCRAFT

Filed Feb. 19, 1962  9 Sheets-Sheet 2

April 7, 1964     J. M. R. BROCARD     3,128,062
AIRCRAFT
Filed Feb. 19, 1962     9 Sheets-Sheet 3
*Fig. 5*
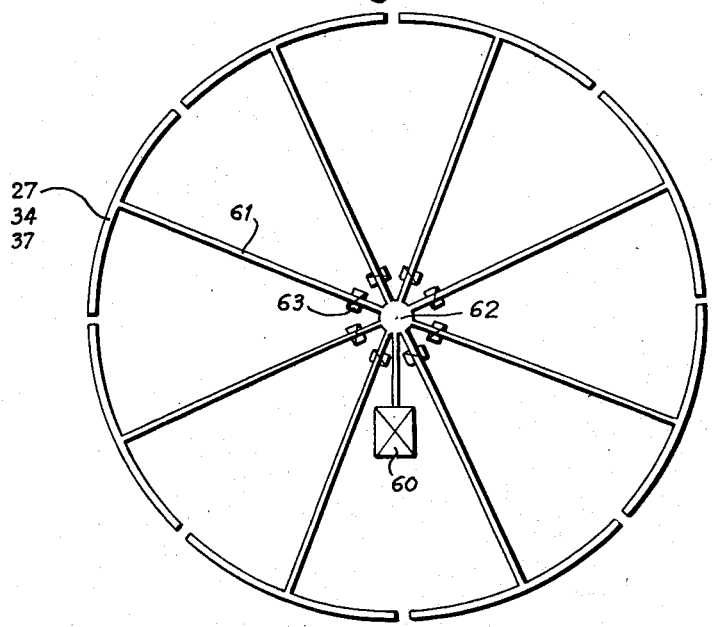
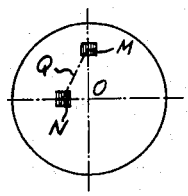
*Fig. 9*
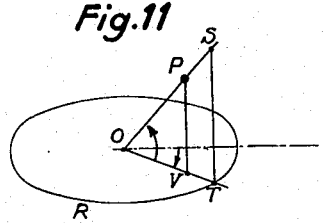
*Fig. 11*
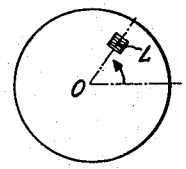
*Fig. 10*

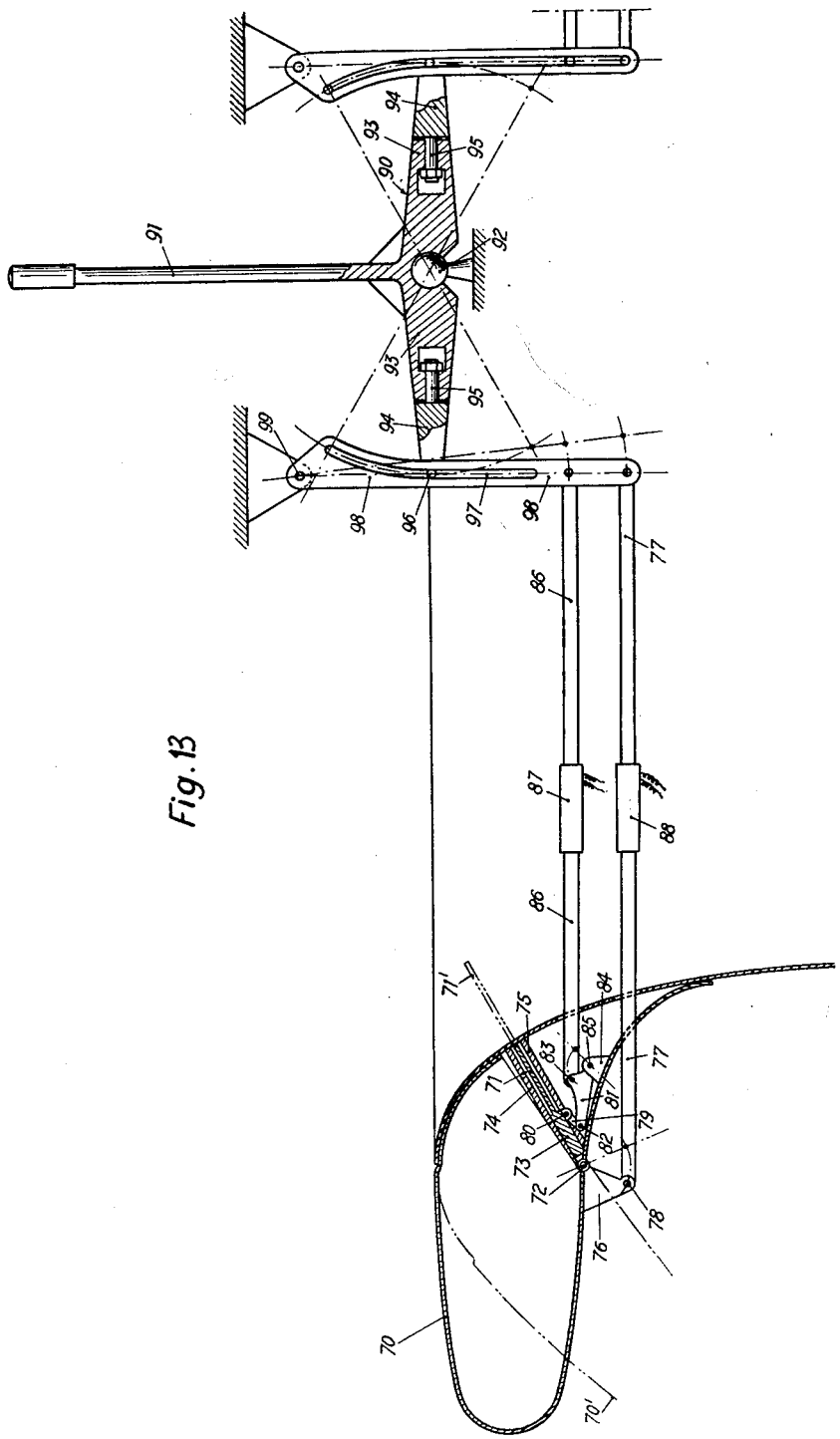

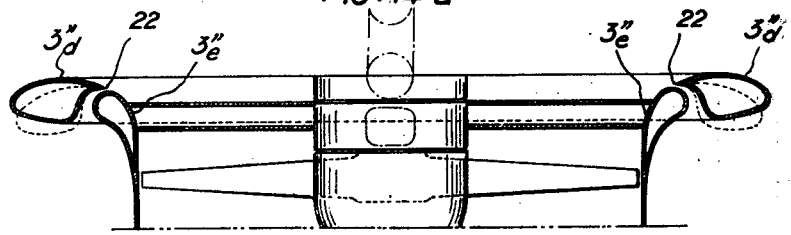
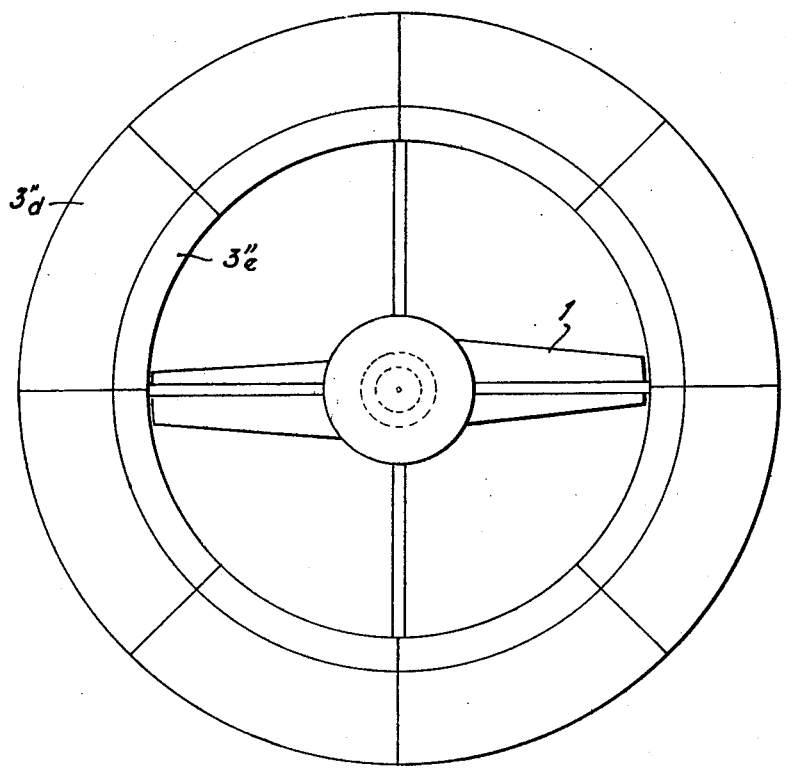

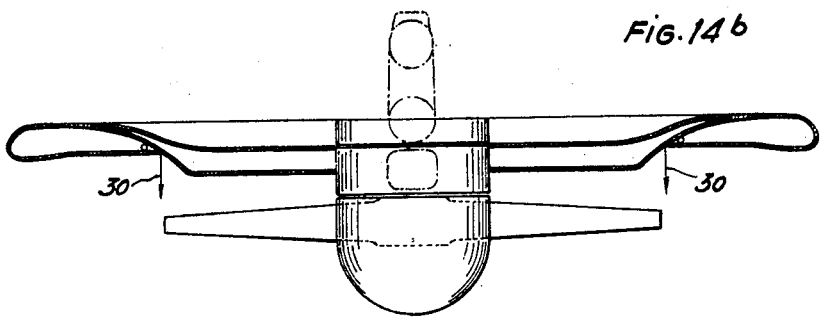
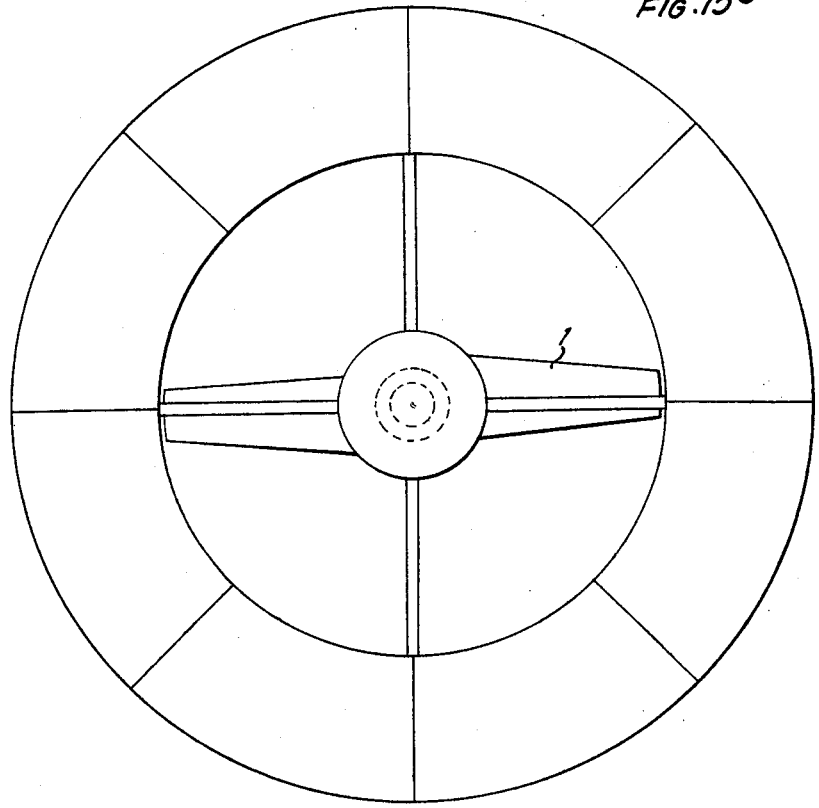

United States Patent Office 3,128,062
Patented Apr. 7, 1964

3,128,062
AIRCRAFT
Jean Marie René Brocard, 32 Rue La Fontaine,
Paris, France
Filed Feb. 19, 1962, Ser. No. 174,314
Claims priority, application France July 19, 1961
7 Claims. (Cl. 244—23)

This invention relates to aircraft that is either piloted or operated by remote control and that is capable of hovering, and capable of flight in any desired direction.

Still more particularly, the invention relates to means for stabilization and piloting control of such a craft.

This application is a continuation-in-part of my copending application Serial No. 765,910, filed October 7, 1958 for "Aircraft," now Patent No. 3,054,578, dated September 18, 1962.

It is among the principal objects of the invention to provide for such an aircraft that is easily maneuvered, simple to pilot and to stabilize.

The foregoing and other objects of the invention will be best understood from the following description of exemplifications thereof, reference being had to the accompanying drawings, wherein:

FIG. 5 is a schematic plan view of the embodiment shown in FIG. 18 but showing it without the external configuration;

FIG. 9 is a schematic plan view illustrating shiftable masses for the changing of weight distribution in the craft;

FIG. 10 is a schematic plan view, similar to FIG. 9, but embodying a modification;

FIG. 11 is a schematic plan view, similar to FIGS. 9 and 10, but embodying a further modification;

FIG. 13 is a large scale fragmentary sectional view of the aircraft of FIG. 12;

FIG. 14a is a schematic elevational view partly in section, showing a modification;

FIG. 14b is a view similar to FIG. 14a but showing a further modification;

FIG. 15a is a plan view of a craft similar to that of FIG. 14a, but embodying a further modification;

FIG. 15b is a plan view of a craft similar to that of FIG. 14b, but embodying the modification of FIG. 15a;

Figure 1:
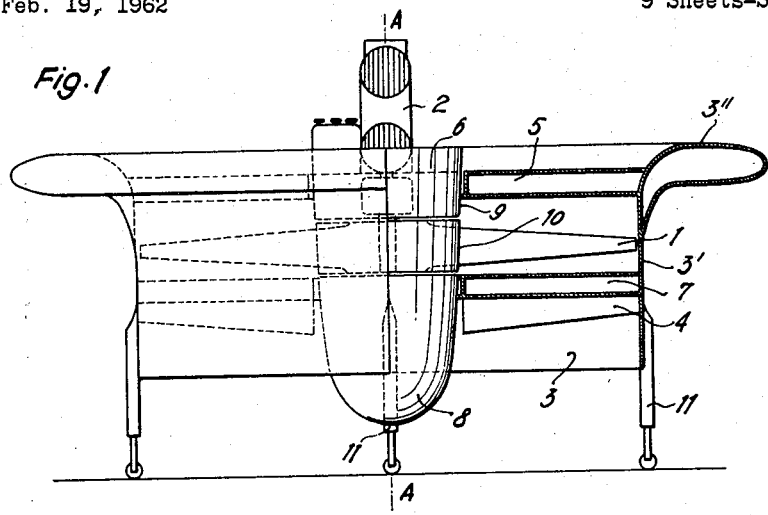
FIG. 1 is a schematic elevational view, partly in section, of an aircraft, the aircraft being shown standing on the ground.
Figure 2:
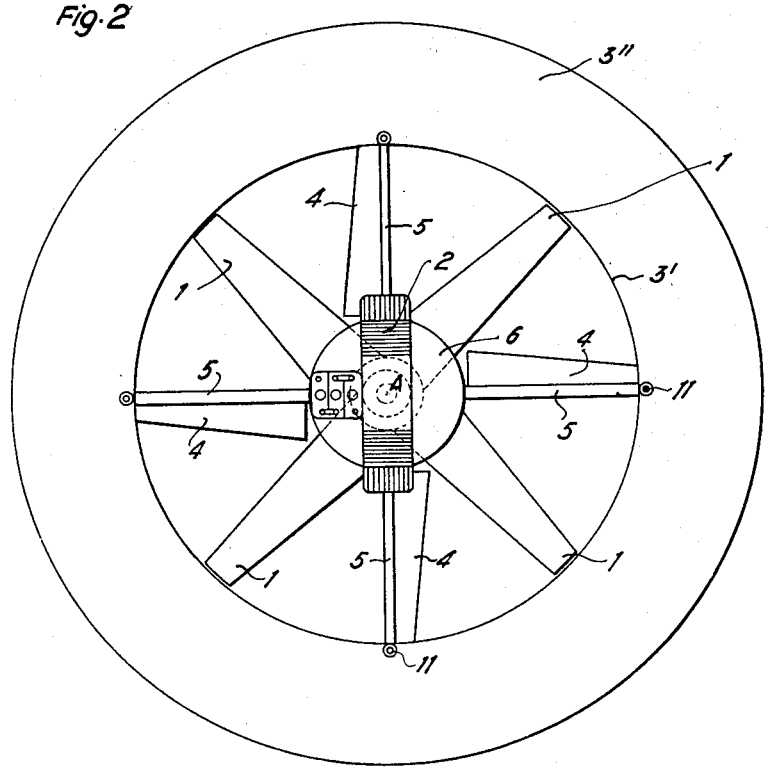
FIG. 2 is a plan view of the aircraft shown in FIG. 1.

To understand the invention, an aircraft of the type to be improved is described now and referring particularly to FIGS. 1 and 2, there is provided a propeller 1 that is driven by a motor 2. The axis A—A of the propeller 1 and motor 2 coincides with the axis of a collector or fairing or fuselage 3. The collector 3 comprises a circular cowling portion 3' that may, as shown in FIG. 1, be cylindrical, and a collecting portion 3" that has a profiled top edge and that forms a convergence guiding air towards the propeller 1. The cowling portion 3' has an interior diameter which is only slightly in excess of the outer diameter of the propeller 1.

Instead of one propeller, two propellers (not shown) may be used rotating in opposite directions about the same axis and having oppositely directed blade pitch. Where two propellers are used, the collector and motor will not be subject to any reaction rotation moment.

Where, however, only a single propeller is used, the collector 3 and the motor 2 will be subject to a reaction rotation moment oppositely relative to the rotation of the propeller. To restrain such reaction moment, fixed or adjustable compensating or deflector or corrector blades or flaps 4 are secured internally to the collector 3 downstream of the propeller 1, which receive air stream propelled by the propeller, and project into this propeller wash and are so arranged as to counteract the aforesaid reaction moment.

The means to counteract the reaction moment of the motor and the collector is not restricted to the exemplification of the previously described lower flaps 4. Such flaps may for this purpose be put upstream or downstream, or both, of the propeller, and where they are adjustable, they may be adjusted in proportion to the thrust delivered by the propeller 1. The exact forms of such flaps 4 will need to be calculated or established by tests.

A platform 6 is provided above the propeller 1, and is secured to the collector 3 by means of upper ribs 5. Lower ribs 7 connect a case 8 of the motor to the collector 3. The propeller 1 is suspended between the platform 6 and the case 8, and thus the propeller-1-and-motor-2-aggregate is supported by the collector 3.

The case 8 is designed to receive all or part of the payload of the aircraft; it may be extended, for aerodynamic reasons by a fixed case 9 which is attached to the platform 6 and by a removable case 10 which is carried and borne along by the propeller 1.

Ground engaging means, such as legs 11, are connected to the collector 3, to support the aircraft on the ground.

The motor 2 can be of any suitable design having the necessary power, and weight, in accordance with the specifications of the craft. The drive of the propeller may include a gear transmission (not shown).

The propeller 1 may have fixed or adjustable pitch, but the pitch should preferably be calculated so as to insure uniformity of circulation along the radius vector. The collector 3 is designed to eliminate marginal losses of the blades of the propeller 1.

The lip or edge of the outer portion of the collecting portion 3" should be so dimensioned, arrived at by calculation and test, as to avoid local breakaway of the air flow during flight.

The collecting portion 3" is profiled according to a wing air foil with a downwardly bent trailing edge. The leading or top edge forms the lips of the convergence of the collecting portion 3", while the trailing edge is connected to the cowling portion 3' of the collector 3.

It is desirable that no breakaway of flow occurs in the airstream along the convergence while the aircraft hovers or is in flight. For this purpose, the collecting portion 3" may have the leading edge equipped with one or more slots 22 that are formed between two elements 3"d and 3"e (FIG. 14a). The slots 22 can be arranged singly (FIGS. 14a, 18) or in plurality (FIG. 17), and may comprise air intake devices or air blowing devices designated 27 (FIG. 18) which may be used simultaneously or separately.

Figure 18:
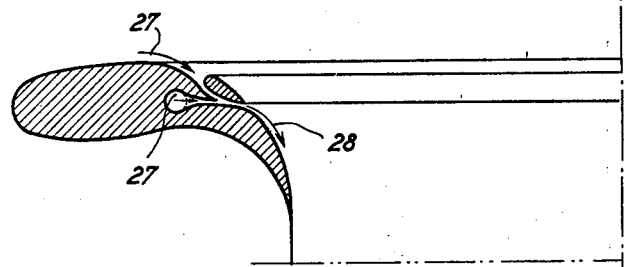
FIG. 18 is a sectional view, similar to FIG. 17, but showing a further modification.
Figure 19:
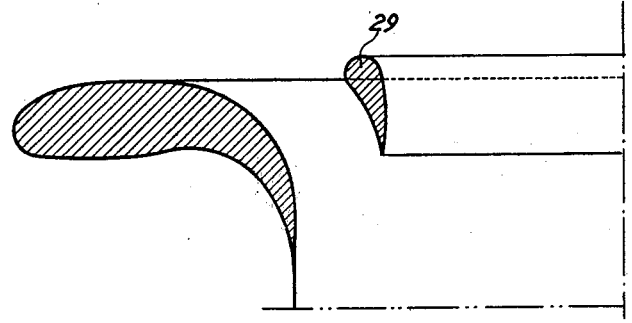
FIG. 19 is a sectional view, similar to FIG. 17, but showing another modification.

Air may be taken in and so compressed that it will escape with a speed near the speed of sound and in escaping will draw in outside air (arrow 27) and eject the mixture into the collector interior (arrow 28, FIG. 18). It is also possible to use at the inside of the convergence of the collecting portion 3" a ring member that is profiled as at 29 (FIG. 19).

The ring 29 will give a better aerodynamic air flow and a better air distribution within the interior of the aircraft between the ring 29 and the collector.

Figure 3:
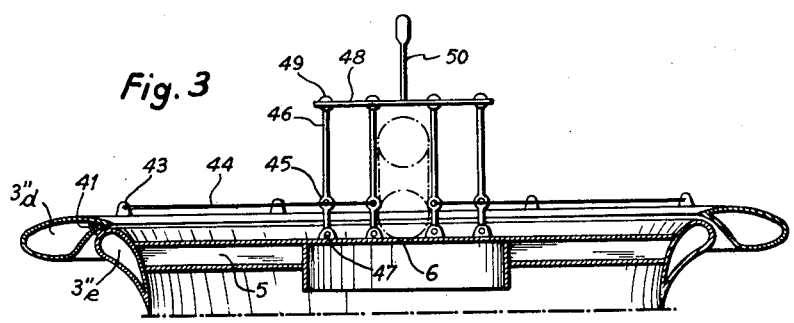
FIG. 3 is a schematic sectional view, taken on the line 3—3 of FIG. 4, similar to FIG. 14a, but showing it in greater detail.
Figure 8:
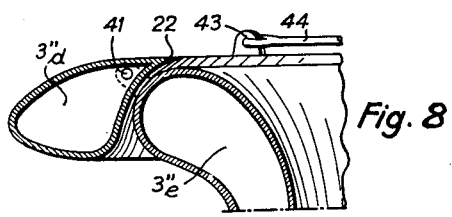
FIG. 8 is a large scale fragmentary schematic sectional view of FIG. 3, but showing it in greater detail.
Figure 17:
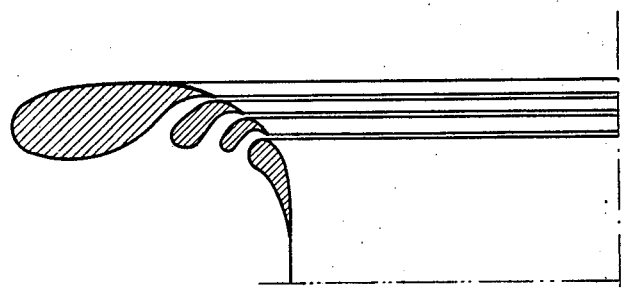
FIG. 17 is a large scale fragmentary schematic sectional view showing a modified detail of the collecting portion of the collector.

As outlined before and referring to FIGS. 3, 8 and 17, it can be understood that by using the slots as shown in these views it will improve the aerodynamic efficiency of the aircraft. The reason is that the air flows over the concave and convex surfaces of the collector, producing a differential of pressure between the surfaces. The slots on the convex surface therefore prevent the stream of air from detaching from the convex surface. This gives a smoother air flow in through the aircraft.

Another method of preventing the detachment of the air stream from the convex surface of the collector, as outlined before, is by blowing air into the interior of the collector. Referring to FIG. 5, compressed air, supplied by the engine compressor, is distributed by a circular collector tube 27 and sent almost tangentially through a slot or a series of small holes 28 into a slot 33 of the lip of the collecting portion 3". The compressed air going through the slot 33 at about the speed of sound pulls a larger quantity of air by suction in a direction shown by arrow 30. Due to this the air stream travels generally in a direction shown by arrow 32 close to the surface of the collector as in the case of the slotted collectors described above.

For air blowing, an air blow device 30 (FIG. 14b) may be placed near the collecting portion 3' of the collector 3, forming a flow flap, and the cowling portion may then be dispensed with.

Figure 6:
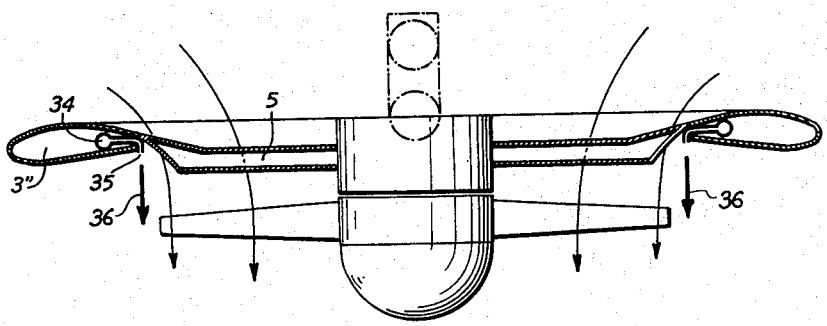
FIG. 6 is a schematic sectional view, similar to FIG. 14b, but showing it in greater detail.
Figure 7:
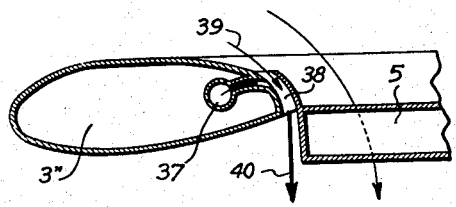
FIG. 7 is a large scale fragmentary schematic sectional view, similar to FIG. 16 but showing a modification.

The blowing arrangement described above can be utilized to form a cylindrical fluid curtain around the aircraft, as shown in FIG. 14b and in FIGS. 6 and 7. Instead of blowing air through the slot 33 air is blown into the open, as shown in FIGS. 6 and 7. This stream of air channels the air produced by the propeller exactly like the cowling of the aircraft. Referring to FIG. 6, a circular tube collector 34 for compressed air blows air downwardly in the direction designated by arrow 36. This may be done by an annular slot or a series of nozzles 35. This air acts like a cowling in maintaining the air produced by the propeller within this airstream and preventing it from spreading radially outwardly.

Figure 16:
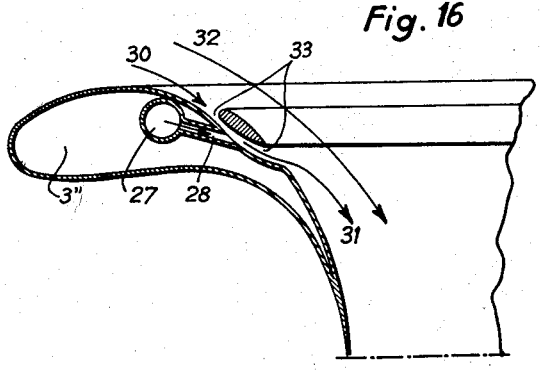
FIG. 16 is a large scale fragmentary schematic sectional view, similar to FIG. 18 but showing it in greater detail.

This downwardly blown air can be utilized in the same manner as outlined in FIG. 16. Referring to FIG. 7, the compressed air distributed by the annular tube 37 is directed into the annular slot 38, escaping at the speed of sound, in a direction shown by arrow 40. The escaping air sucks in a quantity of air as shown by arrow 39. The air directed downwardly, as shown by arrow 40, forms an air cowling.

In operation, the aircraft rises vertically under the effect of the thrust produced by the propeller 1, sucking the air in through the converging collecting portion 3", and blowing it downwardly as propeller wash through the remainder of the collector 3.

The aircraft can hover in the air, or move into any direction, as will be shown later on.

At standstill, the weight of the plane is balanced by the lifting thrust. Stabilizing and piloting is accomplished by various means, some of which are exemplified below.

A first way for re-establishing the stability of the craft may or for piloting it consist in a lateral displacement of the center of gravity of the craft in a direction opposite to that of the occasioned dip. This can be brought about by the shifting of a weight, for instance of a heavy movable part of the equipment like the electric battery. Stabilizing by means of weight shifting is shown in FIGS. 9–11. In FIG. 9, two masses N and M are shiftable according to two planes at right angle, and both planes coincide with the propeller axis. The masses N and M are positioned at all times, however, in a plane at right angle to the propeller axis.

In FIG. 10, a mass L is connected to an arm OL and is turnable with the arm about the propeller axis.

In FIG. 11, a mass P is attached to a rod OP which is tilted in the desired direction about the propeller axis along a plane at right angle thereto.

The tilting is accomplished by rotating the rod OP in the direction designated by arrows shown on FIG. 11. A horizontal plane perpendicular to the vertical axis of the aircraft is designated by a circle R. A point S on an extended axis of the rod OP is shown projected vertically downwardly onto the circle R at point T. The point P is shown projected vertically downwardly on the line OT on the plane R at point V. The fixed mass P, at the end of the rod OP, can be placed in any polar coordinate designated by the arrows shown on FIG. 11. If in practice the axis OP of the rod cannot travel through the paths shown by the two arrows due to an obstacle, as for instance the engine, it is possible to use any structure, such as for example linkages with joints, so as to go around the obstacle and therefore permit the mass P to be placed in any desired position.

The weight shifting may also be brought about by other means, for instance by shifting the position of the body of the pilot, if the craft carries and is controlled by a pilot.

Flight in a horizontal direction is made possible by inclining the aircraft with respect to the vertical while increasing, as desired, the thrust of the propeller 1 by means of the motor 2. The horizontal component of the thrust then produces the flight in the horizontal direction. This inclination can be brought about either by using the stabilizer devices for the vertical flight as described above and below, or by other means, in other types of embodiments of the aircraft as described below.

A second way for stabilizing or piloting control may be achieved by the aforesaid air intake or air blowing devices 27, when the air action is regionally applied, or when the blast is suppressed at certain sections around the periphery of the collector rim or of the flow flap (FIG. 14b).

Referring to FIG. 5, a circular tube 27 is divided into several sections circumferentially independent from each other. Each of these sections is connected to a compressor 60 of the engine through a reservoir 62 by tubes 61. The compressed air may be selectively sent to any number of sections by valves 63 which are controlled by the pilot. When air is fed to all the sections at the same time, there is no piloting. As soon as one or more of the sections on one side are cut off from the feed of air the aircraft inclines toward these sections. This produces a sidewise force causing the aircraft to move. In addition the valves may be set and be used to stabilize the aircraft.

As a third way, directional flight may be controlled by deformation of the collecting portion 3″. To that end, the collecting portion 3″ may comprise a series of sections separated by small radial spaces or cuts (FIGS. 15a, 15b). By inclining one or more of these sections, the craft may be inclined in any azimuth desired by the operator. Furthermore, it is possible to incline diametrically opposite sections in opposite directions, one upward and the other downward, taking on during the flight the controls similar to the controls in the tail units of a conventional airplane. The lateral sections of the collecting portion 3″ (lateral in relation to the direction of flight) may also be deflected, thus producing a warp control to maintain the lateral balance of the craft and to permit turning.

The craft thus does not have any preferred direction of horizontal flight, but may move in any direction and be made to change directions rapidly.

The aforesaid deformation of the collecting portion 3″ may be made in accordance with several alternatives described below.

For instance, the outermost portion 3″d (FIG. 14a) of the collecting portion 3″ may be inclined by a rotation about the trailing edge or about a line near the trailing edge.

Figure 4:
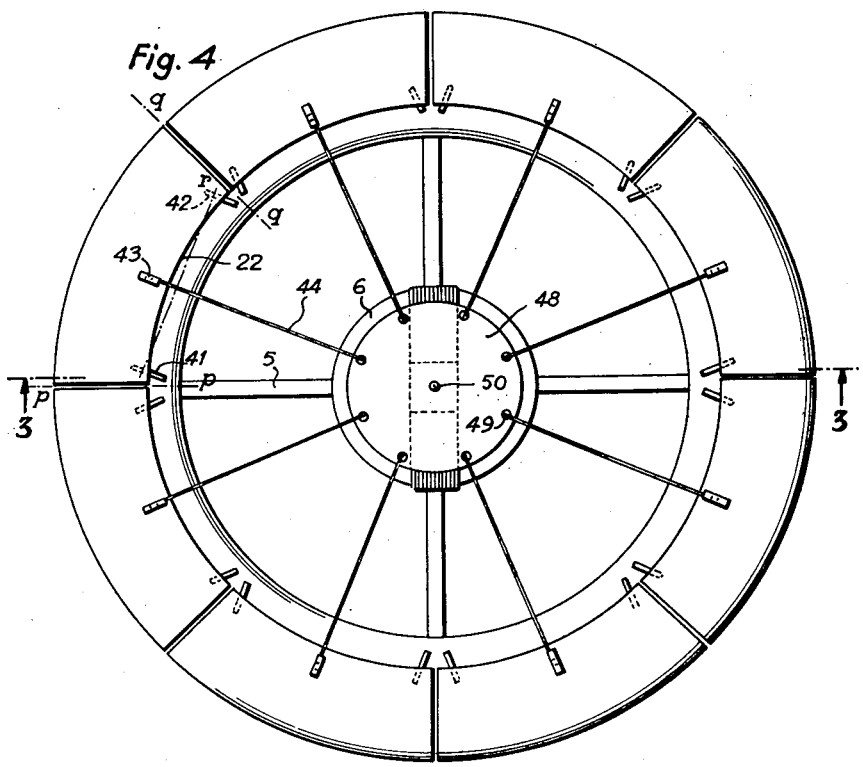
FIG. 4 is a plan view of the aircraft shown in FIG. 3.

Referring to FIGS. 3, 4 and 8, the collector 3″ can be inclined by inclining it in sections. Referring specifically to FIG. 4, the collector is divided in sections such as the one shown between vertical planes pp and qq. These sections are movable about an axis, such as rr. Referring to FIGS. 3, 4, 8, hinges 41 and 42 join 3″d to 3″e. For moving the sections a lever 44 is attached to a lever arm 43 at one end and a lever arm 45 on the lever rod 46 at the other end. The bottom of the rod 46 pivots about a point 47 located on the upper platform 6. An arrangement can be used to coordinate the movement of the different mechanisms to orient the sections 3″d. A simple solution may be to hinge the different lever arms 45 to a crown 48 at 49. Since the connections 43, 45 and 47 are also hinged the pilot may push the crown 48 by means of a single lever 50 in any direction desired. The section nearest to the direction of the push is rotated downwardly about its hinges 41 and 42 and the section diametrically opposite is rotated upwardly about its hinges. The other sections take intermediate positions and the aircraft heads in the direction of the push exerted on the lever 50.

Figure 12:
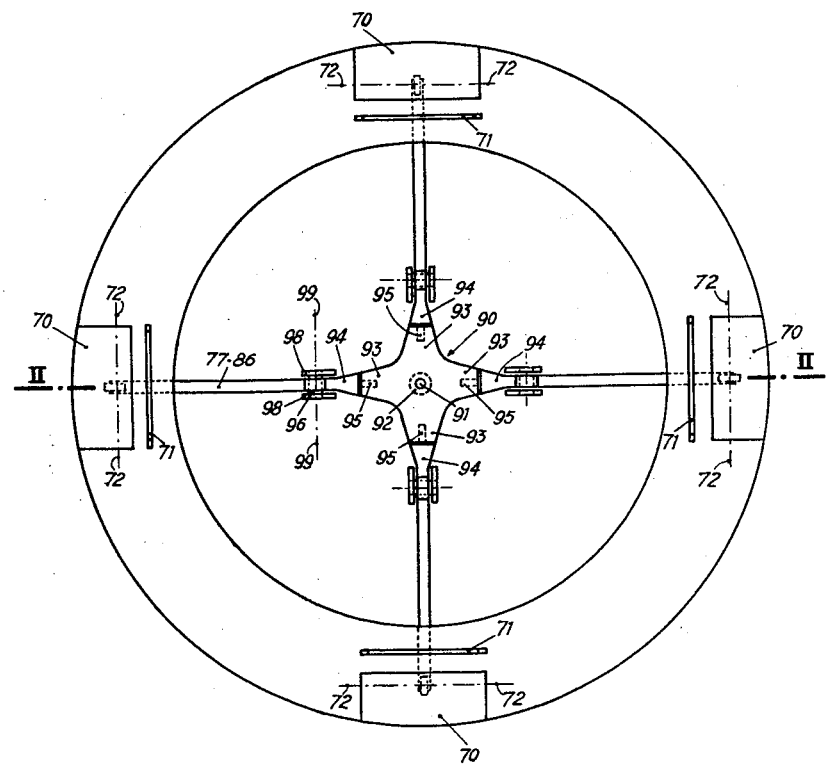
FIG. 12 is a plan view of another embodiment.

A fourth way of piloting the aircraft relates to the embodiment of FIGS. 12 and 13, and more particularly relates to—

The use of spoilers or interceptors inserted in the flux of air which is set in motion by the propeller;

The use of such spoilers or interceptors associated with a deformation of the leading edge of the collector forming the fairing as already disclosed above;

An arrangement for the combined or separate control of the spoilers and of the leading edge of the collector.

My invention relates to a method and means for piloting through the combined use of said two means.

The experiments made in a wind tunnel have shown that the righting moment produced by the deformation of a section of the leading edge of the collector is very small when the aircraft hovers and is stationary in flight. Said moment rises speedily as soon as the aircraft resumes speed in horizontal flight.

Experiments have shown furthermore that spoilers inserted in the upper surface of the collector and, preferably, in the area in which maximum depression arises in flight, produce considerable righting moments when the aircraft is hovering, said moments being reduced during horizontal flight. It is therefore of advantage to resort either to the first piloting system for horizontal flight or else to the second system for hovering during stationary flight or even simultaneously to both piloting methods since the action of one of them will predominate according to the case and the combination of said two methods provides a piloting system satisfactory for all possible conditions of movement of the aircraft.

In the example illustrated in FIGS. 12 and 13, the leading edge of the convergent section of the collector includes four identical sectors 70 adapted to be tilted and arranged at 90° with reference to one another; and to the rear of said sectors with reference to the longitudinal axis of said aircraft, are positioned four identical interceptors or spoilers 71 adapted to move substantially in a direction perpendicular to the surface of the fairing while they are housed in their inoperative position inside the thick edge of the convergent section.

Each of the movable sectors of the convergent section may rotate round a horizontal axis 72—72. In order to ensure continuity in the outline of the fairing, in spite of the rotation imparted to the sectors 70, I give the medial cross-section of the movable sector in a plane passing through the axis of the aircraft and also the stationary section of the fairing, a part circular shape having as a center the center of rotation 72 (FIG. 13). The stationary and movable adjacent surfaces remain thus in joining relationship during the movements of the sector 70 as clearly shown in FIG. 13. Of course the surfaces of the stationary fairing and of the movable sector 70 in the parts which remain in joining relationship are constituted by surfaces of revolution round the axis 72—72 and these surfaces are selected so as to mate as much as possible, the outline of the stationary fairing which is, in its turn, of revolution round the general longitudinal axis of the aircraft. The continuity of the upper surface when the sectors 70 are inoperative, is obtained through a gradual modification in the theoretical tore-shaped outline of the fairing in the vicinity of the movable sectors. The movable sectors 70 may assume a motion which leads them, in the case of FIG. 13, up to the position 70¹.

The interceptors or spoilers 71 are, as already mentioned, housed, when inoperative, inside the thick edge of the convergent section adjacent or, if required, on the inside of the location of the movable sectors 70. These are in the case illustrated constituted by plane surfaces of which the tail-piece 73 is guided translationally by two parallel guides 74 and 75.

The shifting of the movable sector 70 is obtained through a linkage including the lug 76 rigid with the movable sector and the rod 77 pivotally secured at 78 to the lug 76. The movement of the rod 77 produces a rotation of the sector 70 round its axis 72—72. The control of the rod 77 is described hereinafter.

The outward movement of the spoiler 71 is obtained by means of a linkage including two links 79 and 81 interconnected at 82, the former link being furthermore pivotally secured to the tail-piece 73, while the second link is pivotally secured at 85 to a support 84 rigid with the stationary fairing. The rod 86 pivotally secured at 83 to the link 81 produces a shifting of the links and the translational movement of the spoiler 71, the latter being shown at 71¹ in FIG. 13 in its extreme drawn out position. The control of the rod 86 is described hereinafter.

The piloting is performed through the plate 90 on which is fitted a joy stick 91 to be held by the pilot. Within the angular limits defined structurally, said joy stick may assume any angular position in space round the center of the rotula 92 fitted in the stationary fairing of the aircraft. The plate 90 carries four arms 93 which are uniformly spaced and include extensions 94. The latter may revolve round shafts 95 with reference to the arms, the axes of which shafts pass all through the center of the rotula 92. The extensions 94 of the arms carry each a roller 96 of which the movements are guided by the slideway 97 formed on an arm 98 adapted to rock in a vertical plane round an axis 99 rigid with the stationary section of the aircraft. To each of the rocking arms 98 are pivotally secured the outer ends of the rods 77 and 86, which control, as already mentioned, the movements of the movable sectors 70 and of the spoilers of interceptors 71.

In the example illustrated, the lateral sloping of the joy stick towards the left for instance in the plane of FIG. 13 acts only on the sector 70 and on the spoiler 71 on the left hand side, by reason of the arcuate shape given to the slideway 97 round the center of the rotula 92 for the section of said slideway located above the medial position illustrated in FIG. 13 of the roller 96. In such a case, the left-hand movable sector 70 moves downwardly and the left-hand spoiler 71 projects out of its recess. These two movements have a common result consisting in reducing the lift in said areas of the collector and consequently in making the latter slope downwardly towards the sector considered.

As already mentioned, the effects produced by the operations of the movable sector and of the spoiler are added, the effect of the movable sector predominating during horizontal flight as compared to hovering while the effect of the spoiler predominates during hovering periods as compared to horizontal flight periods.

If the joy stick slopes in a direction between the two sectors, which is possible by reason of the rotation of the extensions 94 of the arms 93, the rollers 96 corresponding to the two sectors considered operate the movable sectors 70 and spoilers 71 corresponding thereto in a manner such that these effects are associated and the aircraft slopes in a direction intermediate between said sectors. The aircraft may thus be stabilized during hovering or set for horizontal flight in any desired direction through the action of the pilot on the joy stick 91.

The piloting method described resorts to the direct action of the pilot on the movable parts. Modifications may consist in inserting in the transmission between the pilot and the rods 86 and 77, either control systems or relays, or else electric, hydraulic or hydroelectric jacks or clutches of a known type illustrated symbolically at 87 and 88, which allows increasing or reducing the action exerted by the pilot on the joy stick 91 or again it is posssible to use only one of the two piloting means, that operating through movable sectors or that operating through the spoilers.

Furthermore, it is possible to consider that, for certain applications, only one of said means is provided on the aircraft, for instance, in the case of a machine of a hovering type acting after the manner of a captive balloon, the control through the spoiler alone is sufficient for piloting and stabilizing the aircraft.

Obviously, the invention which includes chiefly the associated use of both piloting methods referred to, is not limited, as to the transmission of the pilot action, to the mechanical means described hereinabove, nor as concerns the spoilers to the manner of shifting the latter and to the shape disclosed for said spoilers.

It should also be remarked that, instead of making the sectors slope along the edge of the collector, it is possible to resort to the deformation of an elastic edge as described in the copending specification, the rods 77 acting then on levers embedded in the elastic mass of the edge so as to provide for the deformation of the latter.

Any and all of the foregoing means may be controlled by suitable arrangement, either directly by the pilot carried by the craft, or by means of suitable well-known remote control devices.

It should be noted that any exemplification described as to the third and fourth ways for piloting the aircraft has a common characteristic: the partial change of the form of the fairing in order to lessen, in at least one sector, the aerodynamical qualities of the fairing.

I do not limit myself to the specific exemplifications shown in the drawing and described in the description, for other modifications will suggest themselves, from the principles thereof to a skilled person.

Having thus described the invention, what I claim as new and desire to be secured by Letters Patent is as follows:

What I claim is:

1. In an aircraft having a propeller the axis of which being substantially vertical, a collector guiding the airstream downwards energized by the propeller and supporting the motor driving the propeller, said collector being co-axial with the propeller axis and having an enlarged collecting portion disposed upstream of the propeller, stabilizing and piloting means comprising a series of sections of the enlarged collecting portion each rotatable about a horizontal axis and means operable to impart a local deformation unsymmetrical with respect to the said axis of the said enlarged collecting portion by lifting at least one of said sections.

2. In an aircraft including chiefly a propeller having a substantially vertical axis carried inside a convergent fairing coaxial with the propeller, the provision of means for piloting and stabilizing the aircraft comprising spoilers adapted to project to an adjustable extent and distributed uniformly round the axis of the aircraft in proximity with the upper surface of the convergent fairing, sectors formed in the edge of the convergent fairing adapted to be angularly shifted each round a horizontal axis, a linkage controlling the amount of projection of the spoilers and the angular setting of said sectors, and a joy stick controlling said linkage and adapted to be controlled by the pilot.

3. In an aircraft including chiefly a propeller having a substantially vertical axis carried inside a convergent fairing coaxial with the propeller, the provision of means for piloting and stabilizing the aircraft comprising spoilers adapted to project to an adjustable extent and distributed uniformly round the axis of the aircraft in proximity with the upper surface of the convergent fairing, elastically deformable portions of the convergent fairing, means for deforming said portions, a linkage controlling the amount of projection of the spoilers and the deformation unsymmetrical with respect to the said axis of said fairing portions, and a joy stick controlling said linkage and adapted to be controlled by the pilot.

4. In an aircraft, the combination with a propeller having a substantially vertical axis carried inside a convergent fairing coaxial with the propeller, of means for piloting and stabilizing the aircraft comprising spoilers operable to project to an adjustable extent and distributed uniformly around the axis of the aircraft in proximity with the upper surface of the convergent fairing sectors formed in the edge of the convergent fairing each actuatable to be angularly shifted about a horizontal axis, a linkage controlling the amount of projection of each spoiler and the angular setting of each of said sectors, and a joy stick controlled by the pilot and controlling said linkage.

5. In an aircraft, the combination with a propeller having a substantially vertical axis carried inside a convergent fairing coaxial with the propeller, means for piloting and stabilizing the aircraft comprising spoilers operable to project to an adjustable extent and distributed uniformly around the axis of the aircraft in proximity with the upper surface of the convergent fairing, sectors formed in the edge of the convergent fairing actuatable to be angularly shifted each about a horizontal axis, and a linkage controlling the amount of projection of the spoilers and the angular setting of said sectors.

6. In an aircraft, including chiefly a propeller having a substantially vertical axis carried inside a convergent fairing coaxial with the propeller, the provision of means for piloting and stabilizing the aircraft comprising spoilers operable to project to an adjustable extent and distributed uniformly around the axis of the aircraft in proximity with the upper surface of the convergent fairing, deformable portions of the convergent fairing, means actuatable for deforming said portions, a linkage controlling the amount of the projection of each of said spoilers and the deformation unsymmetrical with respect to the said axis of said fairing portions, and a joy stick controlled by the pilot and controlling said linkage.

7. In an aircraft, including chiefly a propeller having a substantially vertical axis carried inside a convergent fairing coaxial with the propeller, the provision of means for piloting and stabilizing the aircraft comprising spoilers operable to project to an adjustable extent and distributed uniformly around the axis of the aircraft in proximity with the upper surface of the convergent fairing, deformable portions of the convergent fairing, means for deforming said portions, a linkage controlling the amount of the projection of the spoilers and the deformatin unsymmetrical with respect to the said axis of said fairing portions.

References Cited in the file of this patent

UNITED STATES PATENTS

| | | |
|---|---|---|
| 2,635,837 | Grant | Apr. 21, 1953 |
| 2,843,338 | Streib | July 15, 1958 |
| 2,922,277 | Bertin | Jan. 26, 1960 |
| 2,936,972 | Zinavage | May 17, 1960 |
| 2,948,111 | Nelson | Aug. 9, 1960 |
| 2,967,029 | Hill | Jan. 3, 1961 |

FOREIGN PATENTS

| | | |
|---|---|---|
| 1,158,540 | France | Jan. 27, 1958 |